S. H., N. F. & L. MURRAY.
Machine for Preparing the Tops of Trees for Winter Protection.
No. 221,972. Patented Nov. 25, 1879.
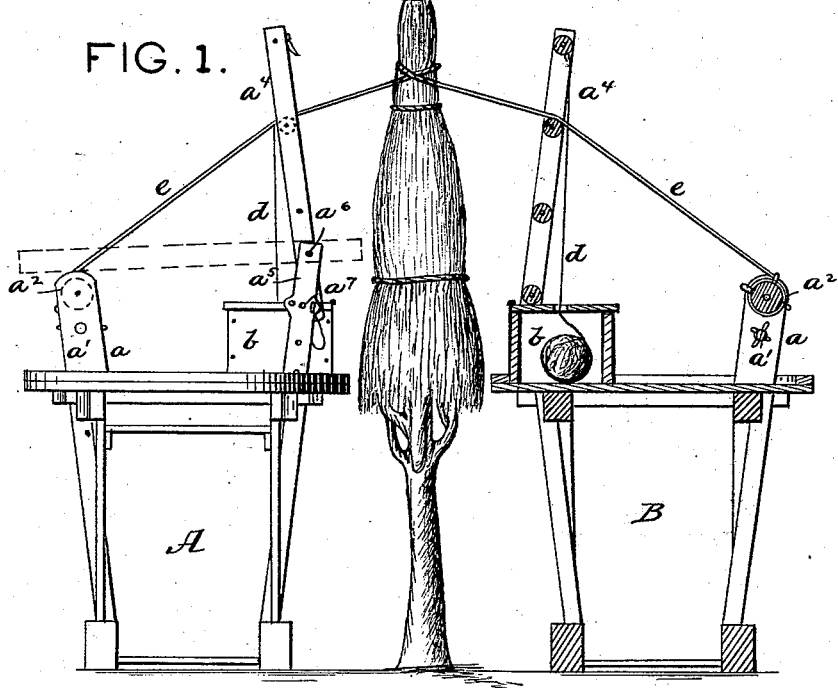
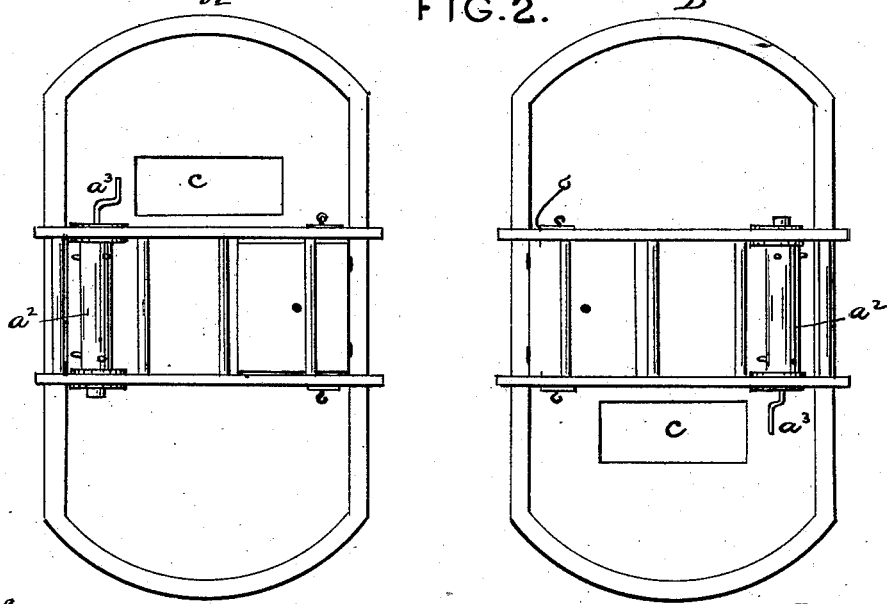
Witnesses:
Sam'l R. Turner
Edwin Baltzley
Inventors
Samuel H. Murray
Nicholas F. Murray
Linville Murray
By R. S. & A. P. Lacey Atty's

UNITED STATES PATENT OFFICE.

SAMUEL H. MURRAY, NICHOLAS F. MURRAY, AND LINVILLE MURRAY, OF FORBES, MISSOURI.

IMPROVEMENT IN MACHINES FOR PREPARING THE TOPS OF TREES FOR WINTER PROTECTION.

Specification forming part of Letters Patent No. 221,972, dated November 25, 1879; application filed September 22, 1879.

*To all whom it may concern:*

Be it known that we, SAMUEL H. MURRAY, NICHOLAS F. MURRAY, and LINVILLE MURRAY, of Forbes, in the county of Holt and State of Missouri, have invented certain new and useful Improvements in Machines for Preparing the Tops of Trees for Winter Protection; and we do hereby declare that the following is a full, clear, and exact description of the invention, which will enable others skilled in the art to which it appertains to make and use the same, reference being had to the accompanying drawings, and to letters of reference marked thereon, which form a part of this specification.

This invention relates to an improvement in means for preparing fruit-trees for winter protection; and it consists of a platform, or a series of platforms, arranged with ladders and windlasses, by which a rope is placed around the limbs of a tree and drawn together, so that they may be secured in a closed position and straw or other covering tied around them.

In the drawings, Figure 1 shows our invention in its proper relation to a tree for preparing it, and represents the work as finished. B, of Fig. 1, is a vertical longitudinal section of one of the platforms. Fig. 2 is a top plan of the platforms.

A and B are platforms, supported on frame-works, all of ordinary construction. They are made large enough to allow of two men moving about on them in manipulating the windlass and ladder. Their height depends upon the average height of the trees in the orchard to be protected, and should usually be very near even with the first branches of the trees.

The platforms are arranged opposite each other, with the tree between, and each is provided with a windlass, $a$, on the side farthest from the tree. The windlass has a movable check-bar below the roller $a^2$ of the windlass and parallel with it, passing through holes in the uprights or supports of roller $a^2$. Its length is greater than that of the roller $a^2$, so that it may be slid far enough on the crank side to engage with and hold the crank $a^3$ from turning, when so desired. Pins are arranged in it to prevent its coming out of its bearings.

Each platform is also provided with a ladder, $a^4$, on the tree side, supported by and hinged to standards $a^5$, so as to allow its top to swing to and from the tree. The standards $a^5$ are of a suitable height and size, and are provided with a hole, $a^6$, in their top end, and a series of holes intermediate between their ends. These standards are attached rigidly and firmly to the platforms. A pin is passed through each of the holes $a^6$ into the ladder at about a foot and a half from their lower end, and forms the hinges for the ladder to move upon, as above described. The holes $a^7$ are for a set-pin that enters a hole in the ladder and holds it stationary. Moving it either to the right or left of the central one gives the ladder an angle to or from the tree. A cord-box, $b$, is attached to the platform at the foot of the ladder, and a hole through the lid lets the cord through for use, as indicated in Fig. 1.

The windlass is preferably made low on the platform, so as to give it additional strength. In accordance with this, a hole, $c$, of suitable dimensions, is made in the platform on the crank side of windlass, and a floor made at a suitable depth below to stand on, so that the operator may be in a comfortable position while turning the crank $a^3$.

$e$ is a cord, with one end attached to one of the windlasses. The other end passes over one of the upper rounds of the ladder, then around the limbs of the tree, and over the corresponding round of the opposite ladder down to, and attaches to, the other windlass.

It will readily be seen that we can dispense with one of the platforms and its rigging and use a stake or any other suitable contrivance for holding one end of the cord and sustaining it at the proper height, while the other platform and rigging performs that function for which we preferably employ two.

The operation of our device is as follows: We place a rigged platform on each of two sides of a tree, with the ladder sides to it. We then raise the ladders on their hinges and fasten them in the position desired by inserting the set-pin through one of the holes $a^7$. We now fasten one end of the rope $e$ to one of the windlasses and pass the other end over that round of the ladder at the point at which we wish to draw our rope around the limbs, then over the corresponding round in the opposite ladder down to the opposite windlass, when, by winding up the rope, we draw the limbs gradually together until sufficiently close, when we slide out the check-bar $a'$ to engage with the crank $a^3$ and hold it from turning, when the operators can devote their attention to covering the limbs thus arranged with straw or whatever material may be desired.

By this means we secure perfect protection to the buds, which almost invariably insures a crop of fruit every year, and at a very slight additional cost.

What we claim is—

The combination, with the platforms A and B, of the swinging ladders $a^4$, standards $a^5$, arranged with the holes $a^6$ $a^7$, windlass $a$, cord-boxes $b$, holes $c$, and rope $e$, substantially as and for the purposes set forth.

In testimony that we claim the foregoing as our own we affix our signatures in presence of two witnesses.

SAMUEL H. MURRAY.
    NICHOLAS FREMONT MURRAY.
    LINVILLE MURRAY.

Witnesses:
    T. C. DUNGAN,
    R. E. KEYT.